Patented Sept. 19, 1939

2,173,699

UNITED STATES PATENT OFFICE

2,173,699

LIQUID COATING COMPOSITIONS AND LAKES THEREFOR

Alfred Siegel, Roselle, N. J., assignor to E. I. du Pont de Nemours & Company, Wilmington, Del., a corporation of Delaware No Drawing. Application October 9, 1936,
Serial No. 104,776

10 Claims. (Cl. 134—58.5)

This invention relates to liquid coating compositions, including printing inks, paints, enamels, etc. This invention further contemplates novel color lakes particularly adapted for use in the aforementioned coating compositions.

It is an object of this invention to prepare novel coating compositions, including printing inks, paints and enamels having improved practical qualities. It is a further object of this invention to provide novel printing inks and other coating compositions, comprising as chief coloring constituent a coloring matter of the phthalocyanine series, thereby endowing said coating compositions with the brilliant shades and other exceptional characteristics of this valuable class of colors. A still further object of this invention is to convert phthalocyanine pigments into novel lakes, whereby to adapt them particularly to the purposes aforementioned. A still further object of this invention is to provide new color lakes in a form adapted for circulation in commerce, thereby constituting a new article of manufacture. Other and further important objects of this invention will appear as the description proceeds.

Phthalocyanine pigments, as blue to green coloring agents, have been described in the literature and are now well known. (See, for instance, British Patents Nos. 322,169, 389,842, 390,149 and 410,814, as well as Journal of the Chemical Society, London, 1934, pages 1016–1039.) Certain lakes thereof are described in U. S. Patent No. 2,000,052 and British Patent 390,149.

It is now recognized by those who use pigments that pure phthalocyanine pigments, while possessing many valuable properties, are nevertheless under great handicaps for use in coating compositions. One of the most noticeable of these handicaps is the extreme difficulty in obtaining complete dispersion of the pigment in the vehicle. This has been explained as a failure of the vehicle to wet the pigment properly and is readily apparent to one skilled in the art. Consequently phthalocyanine pigments are commonly described as "hard to grind".

These difficulties are especially pronounced when phthalocyanine pigments are used in printing inks (pigments ground in lithographic varnish). In addition to being hard to grind the resulting inks have peculiar properties. Ordinarily they are very short and buttery and exhibit such a high degree of "false body" that it is extremely difficult to incorporate a sufficiently large amount of pigment to give an advantageous ratio of pigment to varnish. And such inks are very difficult to use on printing presses because the short buttery inks are deficient in tack and will not feed properly from the fountains.

Lakes of phthalocyanine pigments on the usual substrata, such as alumina hydrate, gloss white, satin white, clay and blanc fixe, while exhibiting some degree of improvement in these various properties, nevertheless fall short from solving the problem completely.

It is also well known (see especially Allen and Siegel U. S. P. 1,772,300) that metallic rosinates and especially the alkaline earth rosinates may be used as substrata under certain conditions, and pigments containing such rosinates as substrata have wide use in the printing ink industry. However, it is recognized that such inks tend to be shorter and more buttery than inks from similar pigments containing no rosinate, and they have very poor flow and a pronounced false body.

It has more recently been shown that certain other natural and synthetic materials (see U. S. P. 2,013,074–77, 2,013,090, 2,013,099 and 2,013,100) can be substituted for the rosin in the products of Allen and Siegel with substantially identical results.

I have now found that, contrary to expectations, pigments of the phthalocyanine series behave in a manner opposite to that indicated by the above series of patents. In other words, I have found that when coloring matters of the phthalocyanine series, whether metallic or metal free, are converted into lakes by the aid of water-insoluble resinates, particularly the alkaline-earth rosinates and other metal-resinates as mentioned in the above series of patents, the resulting lakes have the property of producing lithographic inks of very desirable qualities. More particularly, the resulting inks are "longer" than inks prepared from the straight pigment ("toner"), and their general properties as to body, tackiness, and length are about as satisfactory as one could wish for in the practical arts. Moreover, by arranging the order of procedure in a special manner, the difficulty of "hard grinding" is completely overcome.

Accordingly, my invention consists of converting phthalocyanine coloring matters into resinate lakes, and using these in turn for the preparation of liquid coating compositions, such as inks, paints, enamels and lacquers. As a special feature, my invention comprises a method of procedure whereby to overcome the objections of hard grinding otherwise inherent in these colors.

These methods and procedure are set forth more fully in the following discussion and examples. It will be understood, however, that these examples are merely illustrative, and are not intended to limit this invention. Parts mentioned in these examples are by weight.

As a general proposition, I may arrive at the improved compositions of this invention in two ways.

According to one method, printing inks and paints may be formulated from a dry phthalocyanine pigment using in addition to the pigment an amount of an alkaline earth metallic resinate (preferably barium rosinate from I Wood rosin) equal to from 5 to 50% of the weight of the pigment, with the appropriate vehicle, such as lithographic varnish, linseed oil, alkyd resin varnish, etc.

The following examples will serves to illustrate this method:

Example 1

40 parts of copper phthalocyanine pigment, 10 parts of dry barium rosinate (prepared by precipitating a solution of sodium rosinate from I Wood rosin with barium chloride at the boil and subsequently filtering, washing and drying), and 75 parts of lithographic varnish (Carter's #1 Transparent) are well mixed and ground by giving four passes over a three roller ink mill.

Example 2

40 parts of copper phthalocyanine pigment and 10 parts of dry barium resinate (prepared by precipitating a solution of 10 parts of Venice turpentine in 270 parts of 1% caustic soda at the boil with 10 parts of barium chloride in 100 parts of water) are well mixed with 75 parts of lithographic varnish (Carter's #1 Transparent) and ground by giving four passes over a three roller ink mill.

The blue inks from the above two examples are longer and softer than similar inks prepared without the resinate and either with or without any of the ordinary inert extenders, as blanc fixe or alumina hydrate. The differences are pronounced and constitute to a large degree the difference betwen inks of relatively excellent printing qualities and inks which may be printed only with great difficulty.

While improvements in the ink properties of phthalocyanine pigments are obtained by grinding it with a metallic rosinate as described in Examples 1 and 2, this method of obtaining improved inks does not sufficiently facilitate the grinding of the pigment.

In the second and preferred procedure (preferred because of the ease of incorporation of the pigment in the vehicle as well as because of the greater degree of improvement of the properties of the various compositions) the first step consists of the preparation and isolation of a dry blue lake comprising a phthalocyanine color ("toner") and an alkaline earth resinate, the resinate being precipitated in the presence of the toner. After drying, the resulting dry lake is ground with the proper vehicle to give the desired coating composition of superior properties.

The following examples will serve to illustrate this second procedure:

Example 3

*Preparation of rosinated lake.*—320 parts of a 25% (solids basis) copper phthalocyanine paste (equivalent to 80 parts dry basis) is mixed with a rosin soap solution in turn prepared by mixing 20 parts of I Wood rosin, 2.68 parts of 100% caustic sodia and 250 parts of water and boiling for approximately 30 minutes to a clear solution. The color paste-rosin soap mixture is vigorously agitated mechanically for approximately 1 hour and then a solution of 10 parts of barium chloride ($BaCl_2.2H_2O$), dissolved in 100 parts of water is run in over a period of 10 minutes. The stiff paste so obtained is agitated for about ½ hour, and then filtered, washed chloride free and dried in the usual manner. The yield is 100 parts of lake, consisting of 80% copper phthalocyanine pigment and 20% barium rosinate.

*Preparation of ink.*—40 parts of the pigment prepared above are mixed with 60 parts of lithographic varnish (Carter's #1 Transparent) and then given four passes over a three roller mill. The resulting ink has the properties of length and softness of body, which make it highly desirable as a printing ink.

Example 4

*Preparation of lake.*—A color lake is prepared as in the first part of Example 3, except that 50 parts of copper phthalocyanine is mixed with a sodium rosinate solution from 50 parts of I Wood rosin, 6.7 parts of 100% caustic soda and 625 parts of water, and the mixture is precipitated with 25 parts of barium chloride ($BaCl_2.2H_2O$).

The resulting lake contains approximately 50% copper phthalocyanine and 50% barium rosinate.

*Preparation of ink.*—A printing ink is prepared by grinding 40 parts of the lake from this example with 60 parts of #1 transparent varnish on a roller mill. The resulting ink has excellent length and body and, in addition, exhibits a substantial amount of flow.

Example 5

320 parts of a 25% (solids basis) paste of the metal-free phthalocyanine (equivalent to 80 parts dry basis) is mixed with a rosin soap solution prepared by mixing 20 parts of I Wood rosin, 2.68 parts of 100% caustic soda and 250 parts of water and boiling for approximately 30 minutes to a clear solution. The pigment paste-rosin soap mixture is stirred for 1 hour and then a solution of 10 parts of barium chloride ($BaCl_2.2H_2O$) dissolved in 100 parts of water is run in over a period of ten minutes. The stiff paste so obtained is agitated for about ½ hour and then filtered, washed chloride free and dried in the usual manner. The yield is 100 parts of a lake consisting of 80% metal-free phthalocyanine and 20% barium rosinate.

This lake may be ground into a printing ink according to any well known procedure as for instance that of Example 3, second paragraph.

Example 6

320 parts of a 25% paste of copper phthalocyanine (80 parts of dry color) is mixed with a resin soap solution obtained by dissolving 20 parts of hydrogenated rosin (prepared according to the procedure of U. S. Patents 1,167,264 and 1,899,961) in a boiling solution of 2.68 parts of caustic soda in 250 parts of water. The pigment paste-resin soap solution is stirred for about 1 hour and the rosinate precipitated with a solution of 10 parts of barium chloride ($BaCl_2.2H_2O$) in 100 parts of water. After stirring for ½ hour, the stiff paste is filtered, washed and dried. The yield is 100 parts of a color lake containing 80% copper phthalocyanine.

Example 7

320 parts of a 25% paste of copper phthalocyanine (80 parts dry color) is mixed with a natural resin soap solution prepared by dissolving 20 parts of gamboge resin in a boiling solution of 2.68 parts of caustic soda in 250 parts of water. The resulting mixture is stirred for 1 hour and the resin precipitated with 100 parts of a 10% solution of barium chloride. The stiff paste so obtained is well stirred for ½ hour and then filtered, washed and dried.

Example 8

*Paint.*—30 parts of a lake prepared as in Example 3 are ground with 70 parts of raw linseed oil on a roller mill to give a mill base of a suitable consistency. This mill base is further thinned with linseed oil and suitable thinners, such as turpentine or mineral spirits, and the necessary driers added to give a ready mixed blue paint of desirable properties. This paint may be used in full shades or may be extended by the use of white pigments, such as zinc oxide, lithopone or titanium pigments, to give blue tints.

Example 9

*Enamel.*—20 parts of a lake prepared as in Example 3 are ground with 80 parts of an alkyd resin vehicle on a buhr stone mill to give a mill base of workable consistency. This mill base is diluted with an additional amount of the vehicle to give a final enamel containing 10% of pigment. The desired amount of drier is then added and the enamel thinned to the desired consistency with a suitable volatile liquid, such as solvent naphtha.

Example 10

*Enamel.*—The alkyd resin vehicle in Example 9 is replaced by a rosin-modified, phenolic resin vehicle. The resulting blue enamel is like that of Example 9 except insofar as the properties of the vehicle are different.

The paints and enamels described in Examples 8, 9 and 10 are superior to corresponding paints and enamels made from untreated phthalocyanine pigments in respect to the gloss of the finished composition, and to the ease of grinding of the pigment and its dispersion in the final composition.

It will be clear from the above discussion that I may employ for my invention either metallic rosinates or metallic resinates. It is important to bear in mind the distinction between the two terms. "Rosinate" refers to the soaps of acids, especially abietic, found in colophony (commonly referred to as "rosin") and its derivatives, such as hydrogenated rosin. "Resinate" is a much broader term and is here used to include the soaps of various resin acids, such as those of rosin, both natural and hydrogenated, of gamboge resin, of Venice turpentine and of mastic.

Although the examples show only certain of these resin acids, they are descriptive only and not limiting in nature. Although the barium salt of I Wood rosin is disclosed as the preferred agent, it is nevertheless true, and I declare it as part of my invention, that barium rosinates from other grades of rosin will serve the same purpose, and further that the other alkaline earth metallic rosinates (calcium and strontium) from the usual grades of rosin (as B Wood, I Wood, H Gum, etc.) may also be used in place of the barium rosinates. It is likewise true that calcium and strontium may be used to precipitate the gamboge, Venice turpentine, etc.

I have also found that the other metals of the second group of the periodic table of the elements, such as zinc and cadmium, may likewise replace the barium with excellent results.

It will also be understood that any of the various and well known vehicles of the coating composition industry may replace those enumerated in the examples. For instance there are many grades of lithographic varnish commonly used in the printing ink industry which may be substituted for the Carter's #1 Transparent disclosed above. Likewise, for the purpose of paint or enamel manufacture, the numerous vehicles of the paint and enamel industry, such as the various synthetic and natural resin vehicles, as well as the linseed and other raw and bodied oils, may be used.

It will be further understood that any type of phthalocyanine pigment may replace the copper phthalocyanine and metal-free derivatives enumerated above.

In the matter of proportions, the examples show the use of 20% and 50% of barium resinates, but these are illustrative and preferred amounts only, for the effect is present with as low as 5% of resinate and with all amounts between 5% and 50% resinate. Inasmuch as the strength of the pigment lake is a function of the content of phthalocyanine, it is advantageous for many uses to use as little resinate as will give the desired properties. On the other hand, if flow, for instance is more important than strength, then the higher amounts of resinates, such as 50%, are recommended.

Inks and paints prepared according to this invention may be used in all those places in which such coating compositions are applicable, whereas the corresponding compositions prepared without the use of metallic resinates have a distinctly limited use. The lakes disclosed as ingredients of these compositions are themselves marketable articles of manufacture, and have a very broad scope of use in coating compositions, such as inks, paints, lacquers, enamels, etc.

The advantages of this invention lie in the improvement in the quality of the coating compositions prepared as described above compared to similar compositions prepared in the absence of the metallic resinates. These advantages are especially pronounced in the case of printing inks and the improvements in the quality of the printing inks will enable phthalocyanine pigments to be used in many types of printing in which they have formerly been used only with great difficulty because of the short, buttery nature of the inks and their high degree of false body which very deleteriously affected the behavior of the inks on the presses and particularly the manner in which they fed from the fountains.

In contrast with these properties, the inks prepared according to the present invention possess excellent properties of length and body, of relative freedom from false body, of good tack and in some cases of excellent flow. These properties are particularly surprising in view of the well recognized experience of the trade in the use of pigments made as disclosed in the U. S. patents above cited, which clearly indicates that, as a general rule, metallic resinates when used as substrata tend to increase the shortness, buttery nature, and false body of the ink.

Another advantage of this invention lies in the pronounced improvement in the texture of the phthalocyanine pigments which have been coated with the metallic resinate. This property of improved texture is one which is readily apparent to those skilled in the use of pigments.

It will be readily apparent now that my invention is not limited to the precise details above set forth, but may be varied widely within the skill of those versed in this art.

In the claims below the terms "lake", "color lake" and "pigment lake" shall be taken as synonyms for a composition of matter comprising a coloring substance mixed with a substratum. The pure coloring matter, where specific distinction is necessary, will be designated as "toner".

I claim:

1. A color lake consisting principally of a water-insoluble phthalocyanine coloring matter intimately associated with a metallic resinate the metal of which is an element from the second group of the periodic table of atomic weight below that of mercury, said color lake being characterized by easier grinding qualities than the undiluted toner and by its adaptability to yield a printing ink of greater length, lower consistency and better flow than printing ink similarly prepared directly from the same toner.

2. A color lake as defined in claim 1, the coloring matter being a metal-free phthalocyanine, and the proportion of resinate being from 5 to 50% by weight of the entire composition.

3. A color lake as defined in claim 1, the coloring matter being a metallic phthalocyanine, and the proportion of resinate being from 5 to 50% by weight of the entire composition.

4. A color lake consisting principally of a water-insoluble phthalocyanine coloring matter intimately associated with an alkaline earth rosinate in a ratio not exceeding 50 parts of the latter to 50 parts of the former by weight, said color lake being characterized by easier grinding qualities than the undiluted toner and by its adaptability to yield a printing ink of greater length, lower consistency and better flow than printing ink similarly prepared directly from the same toner.

5. A pigment lake adapted for the manufacture of liquid coating compositions, said pigment lake consisting of metal free phthalocyanine intimately associated with barium rosinate in the ratio of about 80 parts of the former to about 20 parts of the latter by weight.

6. A pigment lake adapted for the manufacture of liquid coating compositions, said pigment lake consisting of copper phthalocyanine intimately associated with barium rosinate in the ratio of about 80 parts of the former to about 20 parts of the latter by weight.

7. The process of preparing a lake suitable for use in liquid coating compositions, which comprises precipitating from aqueous solution a resin soap of an alakline-earth metal in the presence of an aqueous suspension of a water-insoluble phthalocyanine coloring matter, and recovering the colored lake thus produced.

8. A liquid coating composition comprising an oily vehicle and a water-insoluble phthalocyanine coloring matter intimately associated with a water-insoluble metallic resinate the metal of which is an element of the second group of the periodic system and has an atomic weight below that of mercury.

9. A printing ink comprising a printing ink vehicle and a color lake as defined in claim 1.

10. A process of preparing a coating composition which comprises grinding together a liquid vehicle, a water-insoluble phthalocyanine coloring matter, and a water-insoluble metallic resinate the metal of which is an element of the second group of the periodic system and has an atomic weight below that of mercury.

ALFRED SIEGEL.